US010167149B2

(12) United States Patent
Jeong et al.

(10) Patent No.: US 10,167,149 B2
(45) Date of Patent: Jan. 1, 2019

(54) BANKNOTE SEPARATION APPARATUS AND METHOD FOR BANKNOTE BUNDLE RECEIVING MACHINE

(71) Applicant: Nautilus Hyosung Inc., Seoul (KR)

(72) Inventors: Yun Seok Jeong, Suwon-si (KR); Byung Man Ahn, Seongnam-si (KR)

(73) Assignee: HYOSUNG TNS INC., Seoul (KR)

( * ) Notice: Subject to any disclaimer, the term of this patent is extended or adjusted under 35 U.S.C. 154(b) by 0 days.

(21) Appl. No.: 15/688,989

(22) Filed: Aug. 29, 2017

(65) Prior Publication Data

US 2018/0286166 A1 Oct. 4, 2018

(30) Foreign Application Priority Data

Mar. 31, 2017 (KR) ........................ 10-2017-0041578

(51) Int. Cl.
*B65H 3/06* (2006.01)
*G07D 11/00* (2006.01)
(Continued)

(52) U.S. Cl.
CPC ........... *B65H 3/0676* (2013.01); *B65H 3/047* (2013.01); *B65H 3/0607* (2013.01); *B65H 3/0661* (2013.01); *B65H 3/0684* (2013.01); *B65H 3/68* (2013.01); *B65H 33/04* (2013.01); *G07D 11/0021* (2013.01); *G07D 11/0024* (2013.01); *G07D 11/0084* (2013.01); *G07D 11/0096* (2013.01); *B65H 2403/514* (2013.01);
(Continued)

(58) Field of Classification Search
CPC .... B65H 3/0676; B65H 3/0684; B65H 3/047; B65H 3/0607; B65H 3/0661; B65H 3/68; B65H 2404/1521; B65H 2404/2693; B65H 2403/514; G07D 11/0021; G07D 11/0024; G07D 2211/00
See application file for complete search history.

(56) References Cited

U.S. PATENT DOCUMENTS

2006/0113722 A1* 6/2006 Hattori ..................... B65H 1/12 271/121
2009/0014940 A1* 1/2009 Lim ..................... B65H 3/0607 271/3.14
(Continued)

FOREIGN PATENT DOCUMENTS

JP 2011-020797 A 2/2011
KR 10-2016-0081303 A 7/2016

*Primary Examiner* — David H Bollinger
(74) *Attorney, Agent, or Firm* — Bacon & Thomas, PLLC

(57) ABSTRACT

A banknote separation apparatus, for a banknote bundle receiving machine, includes a guide unit, a pickup roller unit, a pickup roller raising/lowering unit, a feeding roller unit and a gate roller unit. The guide unit is provided on a route along which a banknote bundle inputted into the banknote bundle receiving machine is moved. The pickup roller unit is provided above the guide unit in a spaced-apart relationship with the guide unit and configured to separate a banknote from the banknote bundle and to feed the banknote. The pickup roller raising/lowering unit is configured to raise or lower the pickup roller unit. The feeding roller unit is provided on a back side of the pickup roller unit. The gate roller unit is provided under the feeding roller unit and configured to maintain a predetermined distance from the feeding roller unit.

11 Claims, 7 Drawing Sheets

(51) Int. Cl.
*B65H 33/04* (2006.01)
*B65H 3/04* (2006.01)
*B65H 3/68* (2006.01)
*G06F 19/00* (2018.01)
*G07D 9/00* (2006.01)

(52) U.S. Cl.
CPC ................ *B65H 2404/1521* (2013.01); *B65H 2404/2693* (2013.01); *G06F 19/00* (2013.01); *G07D 9/00* (2013.01); *G07D 2211/00* (2013.01)

(56) References Cited

U.S. PATENT DOCUMENTS

2014/0197593 A1* 7/2014 Machii ................. B65H 3/5261
271/121
2015/0084263 A1* 3/2015 Kanzawa ................. B65H 1/14
271/3.2

* cited by examiner

BANKNOTE SEPARATION APPARATUS AND METHOD FOR BANKNOTE BUNDLE RECEIVING MACHINE

CROSS-REFERENCE TO RELATED APPLICATION

This application is based on and claims priority from Korean Patent Application No. 10-2017-0041578, filed on Mar. 31, 2017, the disclosure of which is incorporated herein in its entirety by reference for all purposes.

TECHNICAL FIELD

The present disclosure relates to a banknote separation apparatus and method for a banknote bundle receiving machine.

BACKGROUND

Generally, an automated teller machine (ATM) is an automatic apparatus capable of providing financial services such as receiving/dispensing of bills and checks or the like in an unmanned manner using a card or a bankbook without intervention of a bank teller regardless of time and location.

In recent years, the use of automated teller machines is increasingly expanded not only in a financial institute such as a bank or the like but also in a convenience store, a department store and a public place.

Depending on the receiving and dispensing of banknotes, the automated teller machines may be classified into a banknote dispensing machine, a banknote receiving machine and a banknote receiving/dispensing machine. Recently, the automated teller machines are used for various applications such as receiving/dispensing of bills, receiving/dispensing of checks, updating of bankbooks, paying fees by giro, selling of tickets, and the like.

In a conventional automated teller machine, there are separately provided an apparatus for receiving and dispensing checks and an apparatus for receiving and dispensing bills. These apparatuses are separately mounted to a body of the automated teller machine.

Specifically, one or more bills can be received and dispensed through the bill receiving/dispensing apparatus, and one or more checks can be received and dispensed through the check receiving/dispensing apparatus. When the bill receiving/dispensing apparatus and the check receiving/dispensing apparatus are separately provided in this manner, the overall size of the automated teller machine is increased. This poses a problem in that it is difficult to efficiently utilize a space.

Meanwhile, the size of checks is often set to a uniform size. However, in some foreign countries, checks are provided in different sizes. For example, personal checks issued by a person may be different from business checks issued by a business entity. In this case, there is a problem in that it is impossible to receive and dispense a bundle of checks having different sizes.

Furthermore, when bills and checks (hereinafter referred to as "banknotes") are received and dispensed in the form of a bundle, there may be posed a problem that the banknotes are caught in a feeding unit in the course of simultaneously feeding several banknotes. As a result, the process of receiving and dispensing banknotes may be delayed or may not be performed.

Accordingly, a demand has existed for the development of a banknote bundle receiving/dispensing machine capable of simultaneously receiving and dispensing banknotes in the form of a bundle, capable of making the machine slim and capable of being used in many countries having different banknote standards.

Reference Document: Korean Patent Laid-Open Publication No. 10-2010-30085

SUMMARY

Embodiments of the present disclosure provide a banknote separation apparatus and method for a banknote bundle receiving machine capable of automatically raising or lowering a pickup roller when banknotes are separated and fed one by one in the banknote bundle receiving machine for processing banknotes such as bills or checks in the form of a bundle.

In accordance with an aspect, there is provided a banknote separation apparatus for a banknote bundle receiving machine, including: a guide unit provided on a route along which a banknote bundle inputted into the banknote bundle receiving machine is moved; a pickup roller unit provided above the guide unit in a spaced-apart relationship with the guide unit and configured to separate a banknote from the banknote bundle and to feed the banknote; a pickup roller raising/lowering unit configured to raise or lower the pickup roller unit; a feeding roller unit provided on a back side of the pickup roller unit; and a gate roller unit provided under the feeding roller unit and configured to maintain a predetermined distance from the feeding roller unit.

The pickup roller unit and the feeding roller unit may be connected to each other via a conveyer belt, and the pickup roller raising/lowering unit may be configured to rotate the pickup roller unit about a hinge shaft of the feeding roller unit so that the height of the pickup roller unit is variably adjusted.

The pickup roller raising/lowering unit may include: a lifting plate connected to the hinge shaft and configured to, when applied with an external force, rotate about the hinge shaft to raise or lower the pickup roller unit; a cam member configured to make contact with the lifting plate and configured to apply an external force to the lifting plate by rotational movement; a power transmission unit configured to rotate the cam member; and a power generation unit configured to provide power to the power transmission unit.

The power transmission unit may include: a driving gear operatively connected to the power generation unit; and a driven gear meshed with the driving gear and integrally formed with the cam member so that the cam member is eccentrically installed.

The banknote separation apparatus may further include an elastic member configured to apply a downward biasing force to the pickup roller unit and to make sure that the pickup roller unit comes into contact with the banknote.

The guide unit may be kept stationary.

The guide unit may have an inclined upper surface a height of which is gradually increased from one end near the pickup roller unit to the other end near the feeding roller unit.

The banknote bundle may be returned to an input port when the banknote bundle includes banknotes more than a predetermined number of banknotes.

In accordance with another aspect, there is provided a banknote separation method for a banknote bundle receiving machine, including: raising a pickup roller unit to an uppermost position by a pickup roller raising/lowering unit when a banknote bundle is inputted into the banknote bundle receiving machine; lowering the pickup roller unit by the pickup roller raising/lowering unit to bring the pickup roller unit into contact with the banknote bundle when the banknote bundle reaches a guide unit under the pickup roller unit; and separating a banknote from the banknote bundle by the pickup roller unit.

The pickup roller unit may be lowered by a weight thereof or an elastic member to make contact with the banknote bundle.

The guide unit may be fixed not to move in a height direction.

The banknote bundle may be returned to an input port when the banknote bundle includes banknotes more than a predetermined number of banknotes.

With such configurations, the pickup roller unit can be automatically raised or lowered when banknotes are separated and fed one by one in the banknote bundle receiving machine for processing banknotes such as bills or checks in the form of a bundle.

DETAILED DESCRIPTION

Figure 1:
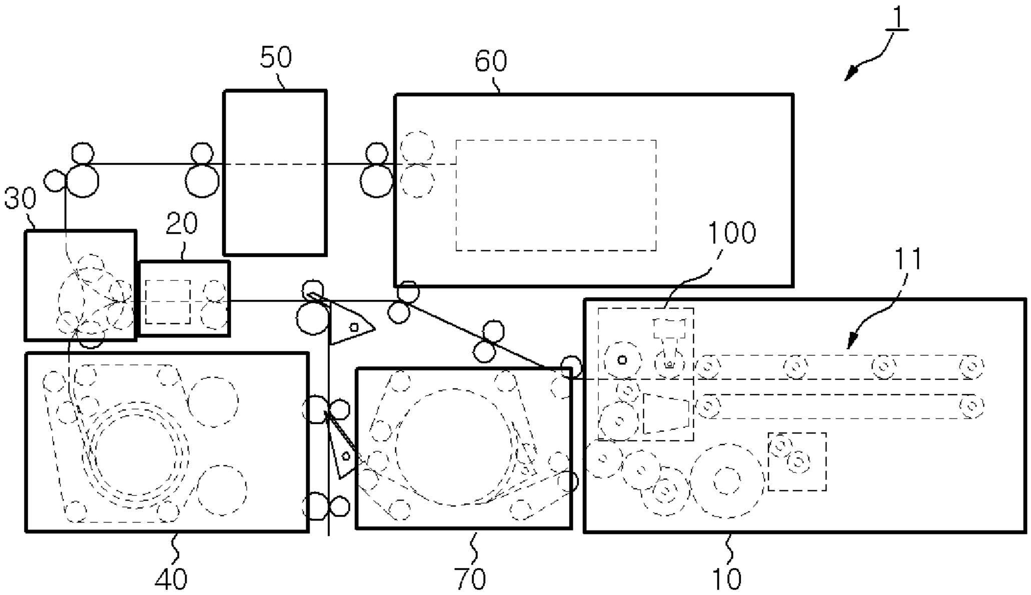
FIG. 1 is a configuration diagram schematically showing a configuration of a banknote bundle receiving machine.

Hereinafter, configurations and operations of embodiments will be described in detail with reference to the accompanying drawings. The following description is one of various patentable aspects of the present disclosure and may form a part of the detailed description of the present disclosure.

However, in describing the present disclosure, detailed descriptions of known configurations or functions that make the present disclosure obscure may be omitted.

The present disclosure may be variously modified and may include various embodiments. Specific embodiments will be exemplarily illustrated in the drawings and described in the detailed description of the embodiments. However, it should be understood that they are not intended to limit the present disclosure to specific embodiments but rather to cover all modifications, similarities, and alternatives which are included in the spirit and scope of the present disclosure.

The terms used herein, including ordinal numbers such as “first” and “second” may be used to describe, and not to limit, various components. The terms simply distinguish the components from one another.

When it is said that a component is “connected” or “linked” to another component, it should be understood that the former component may be directly connected or linked to the latter component or a third component may be interposed between the two components.

Specific terms used in the present application are used simply to describe specific embodiments without limiting the present disclosure. An expression used in the singular encompasses the expression of the plural, unless it has a clearly different meaning in the context.

Figure 2:
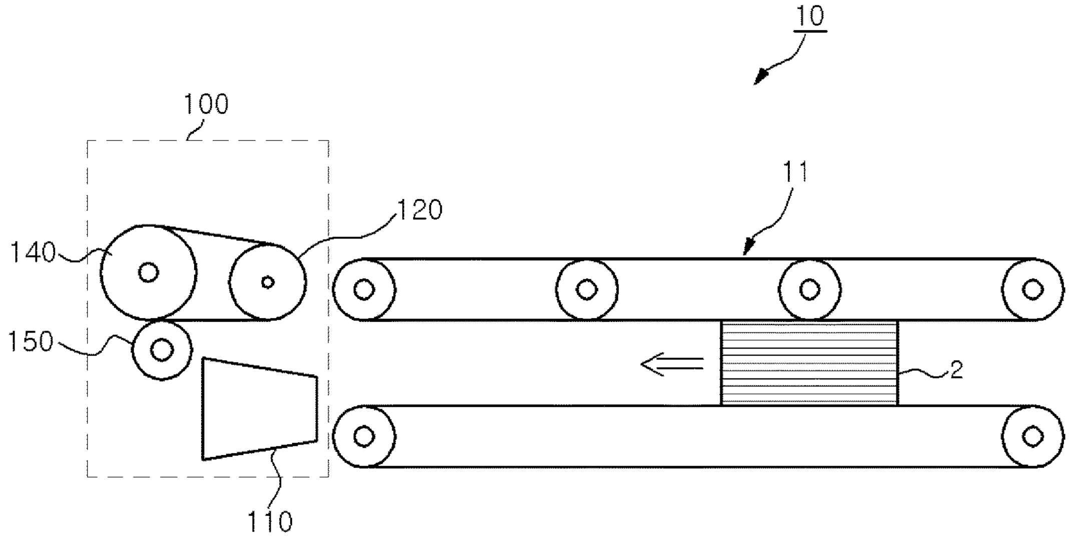
FIG. 2 is a side view schematically showing a receiving/dispensing unit including a banknote separation apparatus in the banknote bundle receiving machine.

FIG. 1 is a configuration diagram schematically showing a configuration of a banknote bundle receiving machine. FIG. 2 is a side view schematically showing a receiving/dispensing unit including a banknote separation apparatus in the banknote bundle receiving machine.

Referring to FIGS. 1 and 2, the banknote bundle receiving machine 1 is an apparatus capable of processing a banknote bundle 2 which includes at least one of bills and checks and which is inputted in the form of a bundle. The banknote bundle receiving machine 1 may include a receiving/dispensing unit 10, an identifying unit 20, a route switching unit 30, a temporary storage unit 40, a printing unit 50, a stacking unit 60, and a rejecting unit 70.

The receiving/dispensing unit 10 is an element for feeding the banknote bundle 2 inputted through an input port along a predetermined route. As shown in FIG. 2, the receiving/dispensing unit 10 may include a banknote separation apparatus 100 for separating and feeding banknotes of the banknote bundle 2 one by one.

In this regard, the banknote bundle 2 refers to banknotes in the form of a bundle or bunch. The banknotes are currency made of paper and may encompass bills and checks. In the present embodiment, the banknote bundle 2 may refer to a bundle of bills, checks or both.

Referring to FIG. 2, in order for the receiving/dispensing unit 10 to feed the banknote bundle 2 along a predetermined route, the receiving/dispensing unit 10 may be provided with a conveyer unit 11 which is rotatable forward or backward in the form of a caterpillar.

Meanwhile, the banknote separation apparatus 100 according to the present embodiment is an element for separating each banknote from the banknote bundle 2 inputted into the receiving/dispensing unit 10 and feeding each banknote to the next station.

Figure 3:
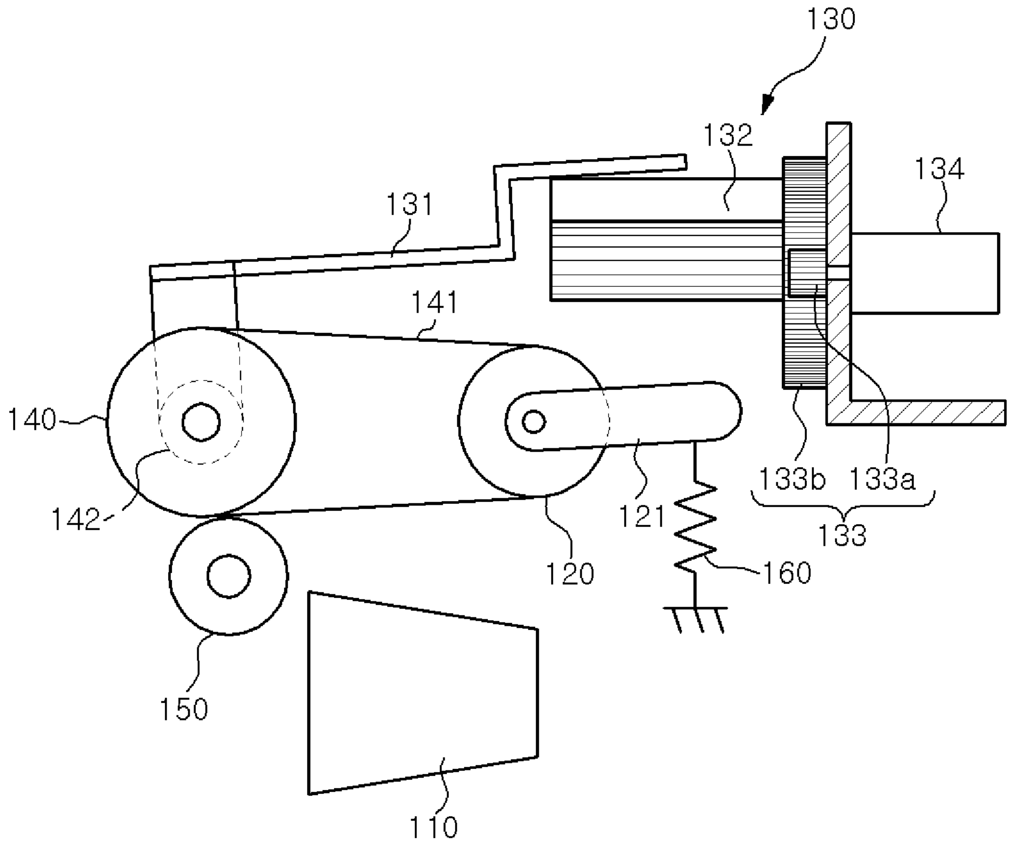
FIG. 3 is a view schematically showing a configuration of a banknote separation apparatus for a banknote bundle receiving machine according to one embodiment.
Figure 4A:
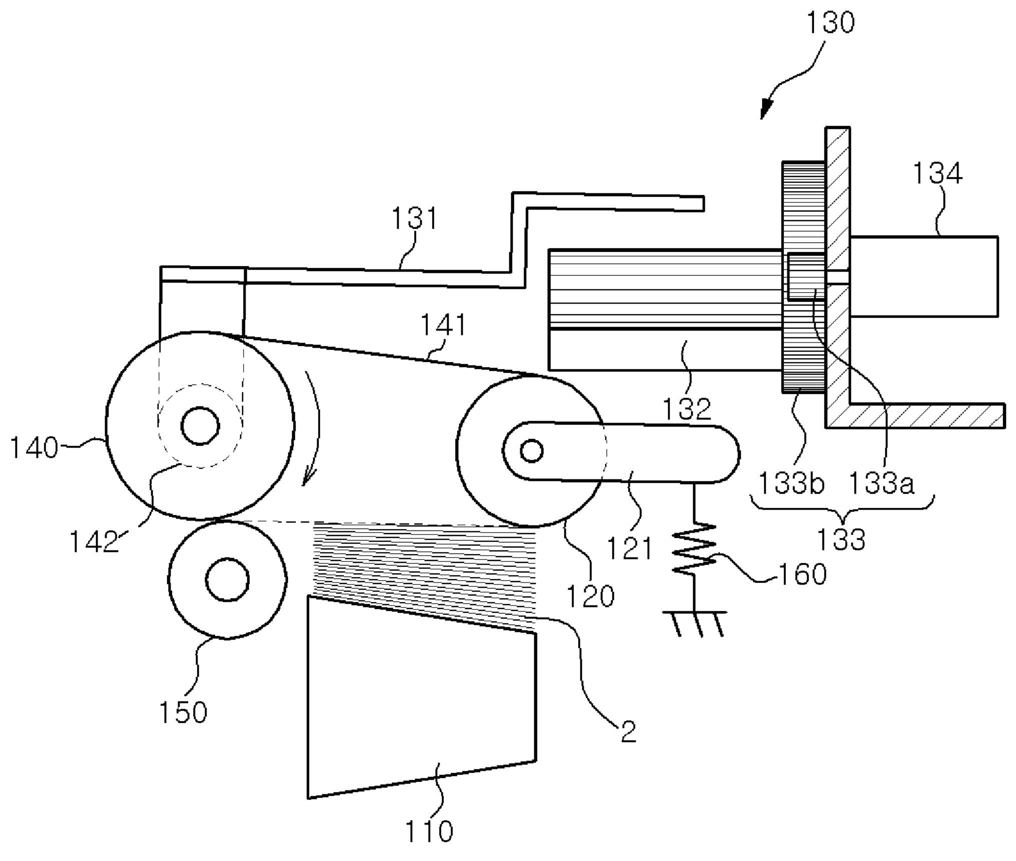
FIGS. 4A and 4B are view showing the operation states of the banknote separation apparatus shown in FIG. 3.
Figure 4B:
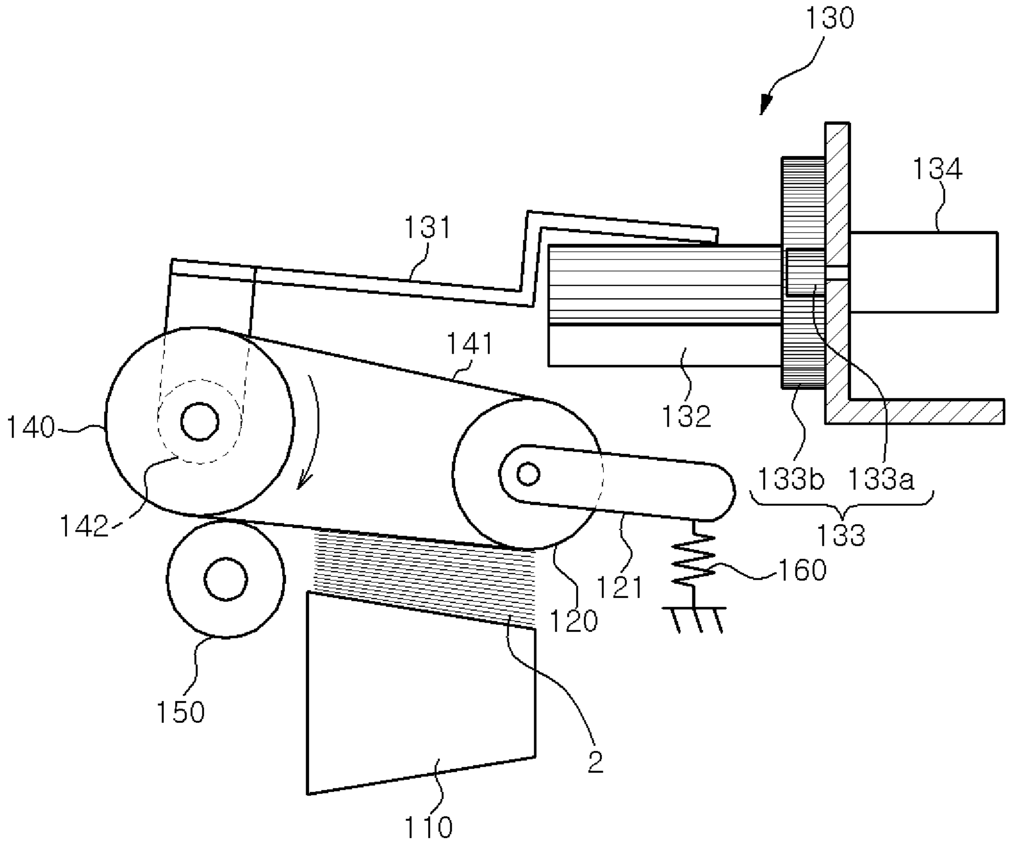
Figure 5:
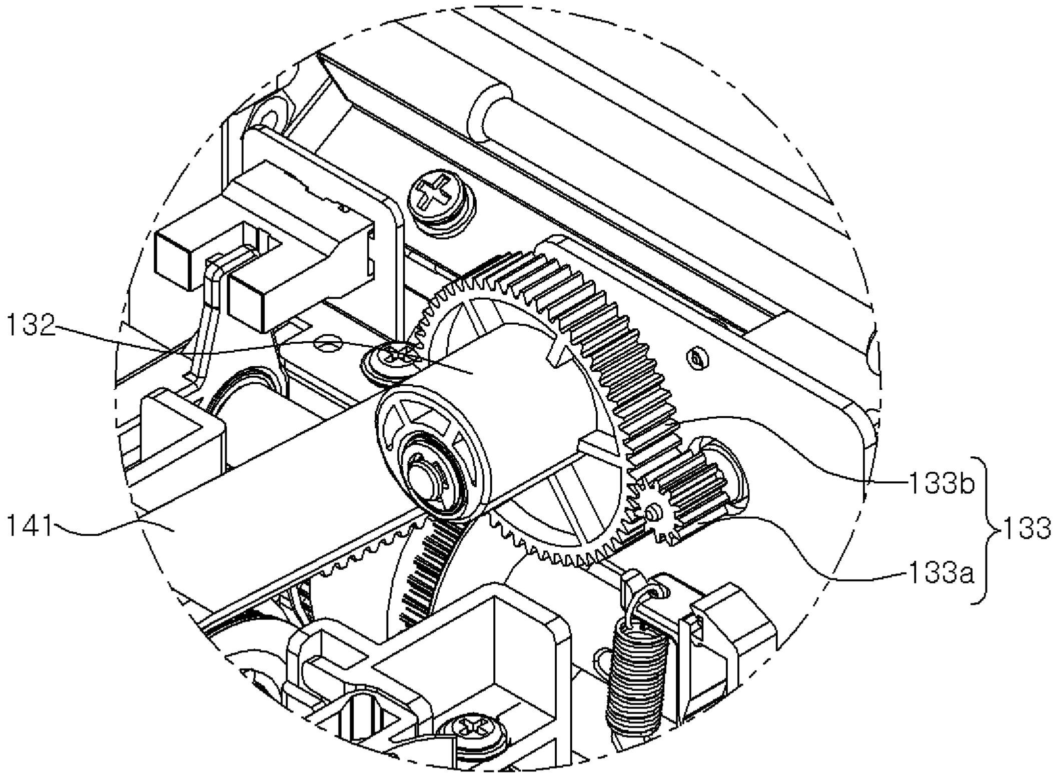
FIG. 5 is a perspective view showing a pickup roller raising/lowering unit according to one embodiment of the present disclosure.

FIG. 3 is a view schematically showing the configuration of the banknote separation apparatus 100. FIGS. 4A and 4B are views showing the operation states of the banknote separation apparatus shown in FIG. 3. FIG. 5 is a perspective view showing a pickup roller raising/lowering unit according to the present embodiment.

Referring to FIGS. 3 to 5, the banknote separation apparatus 100 for a banknote bundle receiving machine according to the present embodiment may include a guide unit 110, a pickup roller unit 120, a pickup roller raising/lowering unit 130, a feeding roller unit 140, and a gate roller unit 150, and the like.

The guide unit 110 is an element provided on a moving route of the banknote bundle 2 inputted into the banknote bundle receiving machine 1. The guide unit 110 may be fixed so as not to move in the height direction. The guide unit 110 may support and guide the banknotes so that they are fed along a predetermined route.

The guide unit 110 may have an inclined upper surface. The height of the upper surface is gradually increased from one end near the pickup roller unit 120 to the other end near the feeding roller unit 140. By the inclined upper surface of the guide unit 110, it is possible to prevent a banknote just below a banknote making contact with the pickup roller unit 120 from moving toward the feeding roller unit 140 together with the banknote making contact with the pickup roller unit 120. Therefore, as compared with a case where the guide unit 110 has a horizontal upper surface, the banknote separation performance can be improved.

The pickup roller unit 120 is provided above the guide unit 110 and is disposed to be spaced apart upward from the guide unit 110 by a predetermined distance. The pickup roller unit 120 may separate and feed a banknote from the banknote bundle 2. In this regard, the distance (height difference) between the pickup roller unit 120 and the guide unit 110 may be set to become equal to or larger than the thickness of the banknote bundle 2.

The pickup roller raising/lowering unit 130 is an element for raising or lowering the pickup roller unit 120. That is to say, the pickup roller unit 120 may be vertically raised or lowered by the pickup roller raising/lowering unit 130.

The reason for providing the pickup roller raising/lowering unit 130 to move up and down is to make sure that even if the overall thickness of the banknote bundle 2 varies, the pickup roller unit 120 is located at a position higher than the uppermost position of the banknote bundle 2 so that the banknote bundle 2 is not interfered by the pickup roller unit 120 when starting a banknote separation work. Since the overall thickness of the banknote bundle 2 may be affected by the thickness of an individual banknote and since the thickness of an individual banknote may vary depending on the countries and regions, it is preferred that the height (position) of the pickup roller unit 120 is adjusted depending on the overall thickness of the banknote bundle 2.

For reference, when starting a banknote separation work, as shown in FIG. 3, the pickup roller unit 120 is located at the uppermost position by the pickup roller raising/lowering unit 130. Thus, the pickup roller unit 120 is located at a position higher than the overall thickness of the banknote bundle 2.

However, if a banknote bundle including a number of banknotes more than a predetermined number of banknotes that can be accommodated under the pickup roller unit 120 when the pickup roller unit 120 is located at the uppermost position is inputted, namely if a banknote bundle including banknotes exceeding the predetermined number is inputted, the banknote bundle may be returned to the input port of the banknote bundle receiving machine 1.

In order to determine whether a banknote bundle including banknotes exceeding the predetermined number is inputted, the following process may be performed.

If the banknote separation apparatus 100 according to the present disclosure fails to normally separate a banknote from the banknote bundle, the banknote bundle receiving machine 1 may determine that the banknote bundle includes banknotes exceeding the predetermined number, and may return the banknote bundle to the input port.

Alternatively, after the banknote separation apparatus 100 separates the predetermined number of (e.g., 10) banknotes, the residual banknotes remaining in the guide unit 110 may be detected by a separate sensor (not shown). The residual banknotes may be regarded as the banknotes exceeding the predetermined number and may be returned to the input port of the banknote bundle receiving machine 1.

On the other hand, if a banknote bundle including the predetermined number of banknotes or less reaches at a position on the guide unit 110, the banknote bundle is detected by a sensor (not shown) provided on a conveyance path. The pickup roller unit 120 is lowered by the pickup roller raising/lowering unit 130. The pickup roller unit 120 thus lowered comes into contact with the uppermost portion of the banknote bundle.

If the banknote bundle includes the predetermined number of banknotes or less, the pickup roller unit 120 thus lowered makes contact with the uppermost banknote of the banknote bundle regardless of the number of banknotes and then perform a banknote separation work. When the number of banknotes of the banknote bundle is relatively large as shown in FIG. 4A, the position of the pickup roller unit 120 may be relatively high. When the number of banknotes of the banknote bundle is relatively small as shown in FIG. 4B, the position of the pickup roller unit 120 may be relatively low.

The specific configuration and operation of the pickup roller raising/lowering unit 130 will be described in detail later.

The feeding roller unit 140 may be provided on the back side of the pickup roller unit 120. As used herein, the term “back side” may refer to a downstream side in a route along which the banknotes are moved when receiving the banknote bundle.

The feeding roller unit 140 is an element for supplying the banknotes provided from the pickup roller unit 120 to the next station. The feeding roller unit 140 may rotate forward or backward depending on the moving direction of the banknotes.

When receiving the banknotes, the feeding roller unit 140 may rotate forward so that the banknotes can move in the forward direction. When returning the banknotes, the feeding roller unit 140 may rotate backward so that the banknotes can move in the backward direction.

The gate roller unit 150 is an element provided below the feeding roller unit 140. The gate roller unit 150 may be installed in a spaced-apart relationship with the feeding roller unit 140 so that only a preset number of banknotes can pass through a gap between the feeding roller unit 140 and the gate roller unit 150.

That is to say, the gap between the feeding roller unit 140 and the gate roller unit 150 may be set so that one banknote can pass through the gap. However, the present disclosure is not limited thereto. If necessary, the gap between the feeding roller unit 140 and the gate roller unit 150 may be set so that two or more banknotes can pass through the gap.

Specifically, the gate roller unit 150 may be a one-way roller that does not rotate when receiving (normally feeding) the banknotes but rotate only in one direction, when returning the banknotes provided from the rejecting unit 70, so that the banknotes are moved in the returning direction.

That is to say, the gate roller unit 150 formed of a one-way roller is not rotated but is kept stationary when the banknotes are moved in the receiving direction, so that only one banknote rather than two banknotes can pass through the gap between the feeding roller unit 140 and the gate roller unit 150. When the banknotes are returned due to cancellation of reception, the gate roller unit 150 is rotated in the returning direction so that the banknotes can move in a direction opposite to the receiving direction.

As shown in FIG. 3, the pickup roller unit 120 and the feeding roller unit 140 may be connected to each other via a conveyer belt 141 to convey the banknotes along a predetermined route. The pickup roller raising/lowering unit 130 may rotate the pickup roller unit 120 about a hinge shaft 142 of the feeding roller unit 140 so that the height of the pickup roller unit 120 can be variably adjusted. To this end, the pickup roller unit 120 and the feeding roller unit 140 may be connected by a separate connecting member (not shown).

The pickup roller raising/lowering unit 130 will now be described in detail.

The pickup roller raising/lowering unit 130 may include a lifting plate 131, a cam member 132, a power transmission unit 133, and a power generation unit 134.

The lifting plate 131 may be connected to the hinge shaft 142 of the feeding roller unit 140 and may extend from the hinge shaft 142 toward the pickup roller unit 120 by a predetermined length.

Accordingly, if the lifting plate 131 is applied with an external force, the lifting plate 131 may rotate about the hinge shaft 142 and may apply a rotational force to the feeding roller unit 140. As a result, the pickup roller unit 120 spaced apart from the feeding roller unit 140 by a predetermined distance may be rotated and raised or lowered by a predetermined height.

In this regard, the pickup roller unit 120 is connected to the feeding roller unit 140 as described above. Thus, if the feeding roller unit 140 is rotated about the hinge shaft 142, the pickup roller unit 120 makes arc-like rotational movement about the hinge shaft 142.

The cam member 132 may make contact with the lifting plate 131 on the lower side of the lifting plate 131 and may apply an upward external force to the lifting plate 131 by rotational movement.

As shown in FIG. 5, the cam member 132 has an eccentric structure in which the rotation axis of the cam member 132 is eccentric. Thus, the moving distance of the lifting plate 131 may be changed as the cam member 132 rotates.

The power transmission unit 133 is an element for rotating the cam member 132. The power generation unit 134 is an element for providing power to the power transmission unit 133. A driving motor may be used as the power generation unit 134.

In this regard, the power transmission unit 133 may include a driving gear 133*a* and a driven gear 133*b*.

The driving gear 133*a* is operatively connected to the power generation unit 134 and may be rotated as the power generation unit 134 operates.

The driven gear 133*b* is meshed with the driving gear 133*a* and may be integrally formed with the cam member 132 so that the cam member 132 can be eccentrically installed. In this case, the driving gear 133*a* and the driven gear 133*b* may have a speed reduction structure to provide an increased torque. Thus, it is preferred that the diameter of the driving gear 133*a* is smaller than the diameter of the driven gear 133*b*.

Accordingly, if the power generation unit 134 such as a motor or the like is operated, the driving gear 133*a* coaxially and operatively connected to the power generation unit 134 is rotated. The driven gear 133*b* meshed with the driving gear 133*a* is rotated by the transmitted power, thereby rotating the cam member 132.

If the cam member 132 rotates, the lifting plate 131 making contact with the cam member 132 rotates counterclockwise as developed from FIG. 4A or 4B to FIG. 3, thereby rotating the hinge shaft 142 counterclockwise. As a result, the pickup roller unit 120 rotates counterclockwise and moves upward to a predetermined height, whereby a banknote bundle 2 having a predetermined thickness enters a gap between the pickup roller unit 120 and the guide unit 110 without any interference.

After the banknote bundle 2 has entered the gap between the pickup roller unit 120 and the guide unit 110, the cam member 132 is further rotated to lower the pickup roller unit 120. As a result, the pickup roller unit 120 comes into contact with the uppermost surface of the banknote bundle 2.

If the cam member 132 is further rotated, the upward external force applied to the lifting plate 131 is eliminated. The pickup roller unit 120 may be moved down by the weight thereof and may contact with the banknote bundle 2.

The present embodiment may further include an elastic member 160 for applying a downward biasing force to the pickup roller unit 120 so as to facilitate downward movement of the pickup roller unit 120 and for making sure that the pickup roller unit 120 makes smooth contact with the banknote bundle 2.

As shown in FIG. 3, the elastic member 160 may be connected to the pickup roller unit 120 through a separate frame 121 to apply a biasing force to the pickup roller unit 120.

Figure 6:
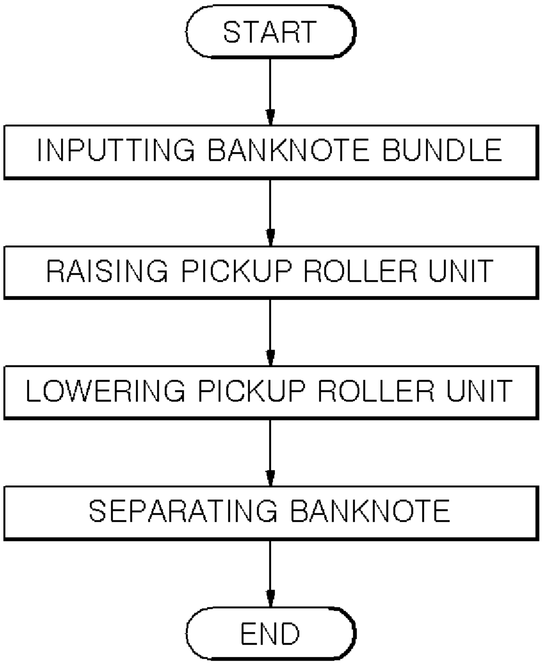
FIG. 6 is a flowchart showing a banknote separation method for a banknote bundle receiving machine according to another embodiment.

A banknote separation method for a banknote bundle receiving machine according to another embodiment of the present disclosure will be described with reference to FIG. 6. The banknote separation method for a banknote bundle receiving machine has been described above for the most part thereof. Therefore, the banknote separation method will be briefly described below.

If the banknote bundle 2 is inputted into the banknote bundle receiving machine 1, it may be possible to perform a step of raising the pickup roller unit 120 to the uppermost position through the use of the pickup roller raising/lowering unit 130. At this time, if the banknote bundle 2 including a number of banknotes exceeding a predetermined number of banknotes is inputted, the banknote bundle 2 may be returned to the input port of the banknote bundle receiving machine 1.

If the banknote bundle 2 reaches the guide unit 110 under the pickup roller unit 120, it may be possible to perform a step of lowering the pickup roller unit 120 through the use of the pickup roller raising/lowering unit 130 and bringing the pickup roller unit 120 into contact with the banknote bundle 2. At this time, the pickup roller unit 120 may be lowered by the weight thereof or by the elastic member 160 to make contact with the banknote bundle 2. The guide unit 110 may be fixed in the height direction.

If the pickup roller unit 120 comes into contact with the uppermost banknote of the banknote bundle 2, it may be possible to perform a step of separating a banknote from the banknote bundle 2 through the use of the pickup roller unit 120.

While the present disclosure has been described above using the preferred embodiments, the scope of the present disclosure is not limited to the specific embodiments described above. A person having ordinary knowledge in the relevant technical field will be able to replace or modify the constituent elements. Such replacement or modification should be construed to fall within the scope of the present disclosure.

What is claimed is:

1. A banknote separation apparatus for a banknote bundle receiving machine, comprising:

a guide unit provided on a route along which a banknote bundle inputted into the banknote bundle receiving machine is moved;

a pickup roller unit provided above the guide unit in a spaced-apart relationship with the guide unit and configured to separate a banknote from the banknote bundle and to feed the banknote;

a pickup roller raising/lowering unit configured to raise or lower the pickup roller unit;

a feeding roller unit provided on a back side of the pickup roller unit;

a gate roller unit provided under the feeding roller unit and configured to maintain a predetermined distance from the feeding roller unit, and an elastic member configured to apply a downward biasing force to the pickup roller unit and to make sure that the pickup roller unit comes into contact with the banknote.

2. The banknote separation apparatus of claim 1, wherein the pickup roller unit and the feeding roller unit are connected to each other via a conveyer belt, and the pickup roller raising/lowering unit is configured to rotate the pickup roller unit about a hinge shaft of the feeding roller unit so that the height of the pickup roller unit is variably adjusted.

3. The banknote separation apparatus of claim 2, wherein the pickup roller raising/lowering unit includes:

a lifting plate connected to the hinge shaft and configured to, when applied with an external force, rotate about the hinge shaft to raise or lower the pickup roller unit;

a cam member configured to make contact with the lifting plate and configured to apply an external force to the lifting plate by rotational movement;

a power transmission unit configured to rotate the cam member; and a power generation unit configured to provide power to the power transmission unit.

4. The banknote separation apparatus of claim 3, wherein the power transmission unit includes:

a driving gear operatively connected to the power generation unit; and a driven gear meshed with the driving gear and integrally formed with the cam member so that the cam member is eccentrically installed.

5. The banknote separation apparatus of claim 1, wherein the guide unit is kept stationary.

6. The banknote separation apparatus of claim 1, wherein the guide unit has an inclined upper surface a height of which is gradually increased from one end near the pickup roller unit to the other end near the feeding roller unit.

7. A banknote separation method for a banknote bundle receiving machine, comprising:

raising a pickup roller unit to an uppermost position by a pickup roller raising/lowering unit when a banknote bundle is inputted into the banknote bundle receiving machine;

lowering the pickup roller unit by the pickup roller raising/lowering unit to bring the pickup roller unit into contact with the banknote bundle when the banknote bundle reaches a guide unit under the pickup roller unit; and separating a banknote from the banknote bundle by the pickup roller unit, wherein the pickup roller unit is lowered by a weight thereof or an elastic member to make contact with the banknote bundle.

8. The banknote separation method of claim 7, wherein the guide unit is fixed not to move in a height direction.

9. A banknote separation apparatus for a banknote bundle receiving machine, comprising:

a guide unit provided on a route along which a banknote bundle inputted into the banknote bundle receiving machine is moved;

a pickup roller unit provided above the guide unit in a spaced-apart relationship with the guide unit and configured to separate a banknote from the banknote bundle and to feed the banknote;

a pickup roller raising/lowering unit configured to raise or lower the pickup roller unit;

a feeding roller unit provided on a back side of the pickup roller unit;

a gate roller unit provided under the feeding roller unit and configured to maintain a predetermined distance from the feeding roller unit, wherein the pickup roller unit and the feeding roller unit are connected to each other via a conveyer belt, and the pickup roller raising/lowering unit is configured to rotate the pickup roller unit about a hinge shaft of the feeding roller unit so that the height of the pickup roller unit is variably adjusted.

10. The banknote separation apparatus of claim 9, wherein the pickup roller raising/lowering unit includes:

a lifting plate connected to the hinge shaft and configured to, when applied with an external force, rotate about the hinge shaft to raise or lower the pickup roller unit;

a cam member configured to make contact with the lifting plate and configured to apply an external force to the lifting plate by rotational movement;

a power transmission unit configured to rotate the cam member; and a power generation unit configured to provide power to the power transmission unit.

11. The banknote separation apparatus of claim 10, wherein the power transmission unit includes:

a driving gear operatively connected to the power generation unit; and a driven gear meshed with the driving gear and integrally formed with the cam member so that the cam member is eccentrically installed.

* * * * *